United States Patent
Forsberg

(10) Patent No.: US 7,458,095 B2
(45) Date of Patent: Nov. 25, 2008

(54) FASTER AUTHENTICATION WITH PARALLEL MESSAGE PROCESSING

(75) Inventor: Dan Forsberg, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/714,638

(22) Filed: Nov. 18, 2003

(65) Prior Publication Data

US 2004/0148504 A1 Jul. 29, 2004

Related U.S. Application Data

(60) Provisional application No. 60/426,794, filed on Nov. 18, 2002.

(51) Int. Cl.
  G06F 7/04 (2006.01)
  G06F 11/00 (2006.01)
  H04L 9/00 (2006.01)
(52) U.S. Cl. .................. 726/3; 726/22; 726/23; 713/168; 709/224; 709/229; 380/247
(58) Field of Classification Search ................ 713/168, 713/169, 178, 201, 202; 380/248, 247; 726/3, 726/4, 22, 23, 26, 27; 709/223, 224, 229
See application file for complete search history.

(56) References Cited

U.S. PATENT DOCUMENTS 5,237,612 A * 8/1993 Raith .......................... 380/247
5,241,598 A * 8/1993 Raith .......................... 713/169
6,088,451 A * 7/2000 He et al. ..................... 713/201
2002/0066035 A1* 5/2002 Dapp .......................... 713/201
2002/0174335 A1* 11/2002 Zhang et al. ................ 713/168
2003/0093539 A1* 5/2003 Simeloff et al. ............. 713/202
2003/0159044 A1* 8/2003 Doyle et al. ................ 713/176
2003/0163704 A1* 8/2003 Dick et al. .................. 713/178
2003/0163727 A1* 8/2003 Hammons et al. ........... 713/201
2003/0212893 A1* 11/2003 Hind et al. .................. 713/177
2003/0226017 A1* 12/2003 Palekar et al. .............. 713/168

* cited by examiner

Primary Examiner—Benjamin E. Lanier
Assistant Examiner—Abdulhakim Nobahar
(74) Attorney, Agent, or Firm—Squire, Sanders & Dempsey L.L.P.

(57) ABSTRACT

The invention is a method of connecting user equipment to at least one network, a communication system, and a user equipment. In a communication system comprising at least one network, including network entities which provide connectivity to user equipment, a method of connecting the user equipment to the at least one network in accordance with the invention includes establishing a secure tunnel which provides connection between the user equipment and one of the network entities; and authenticating the user equipment with another of the network entities; and wherein the authenticating of the user equipment with the another of the network entities occurs at least partially simultaneously with the establishing of the secure tunnel.

18 Claims, 19 Drawing Sheets

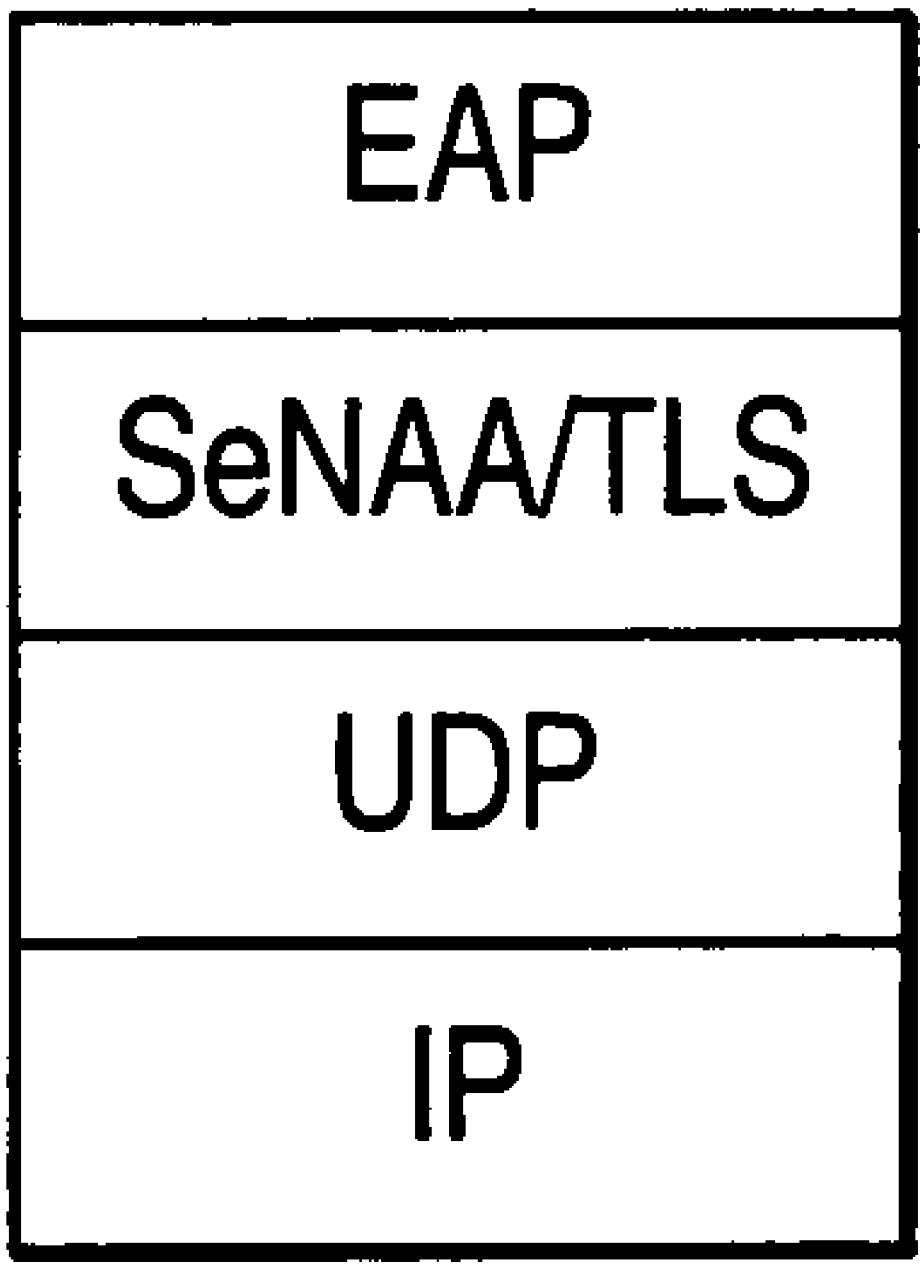

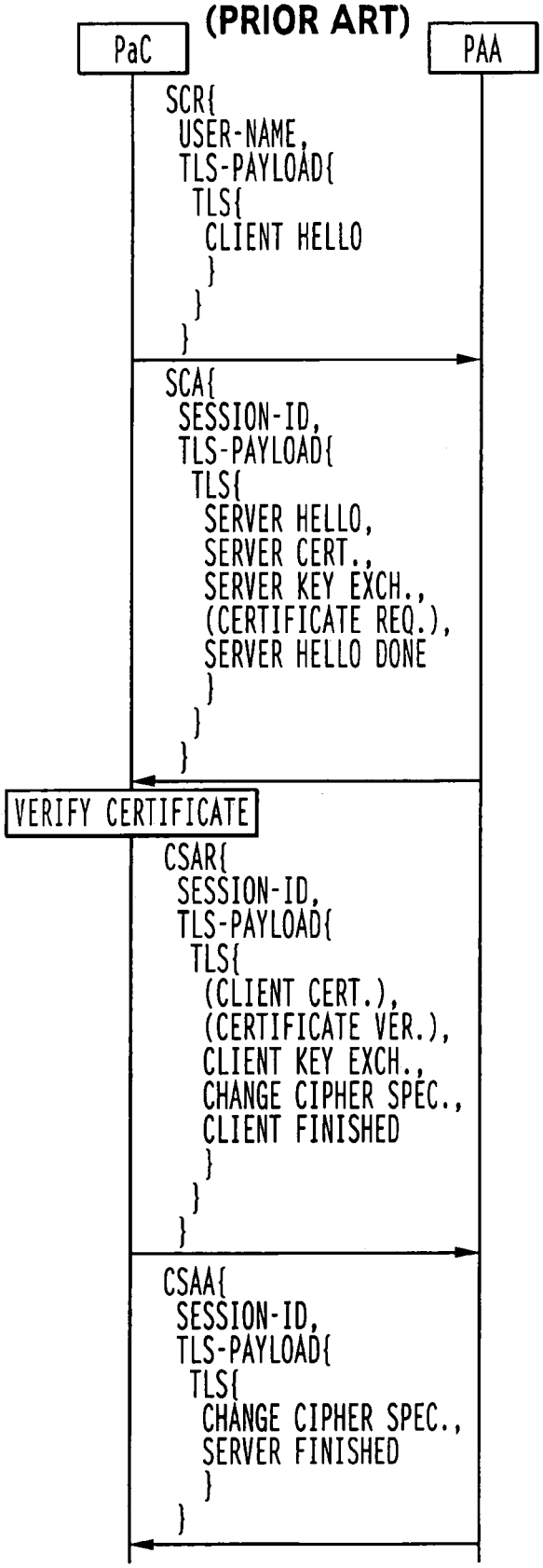

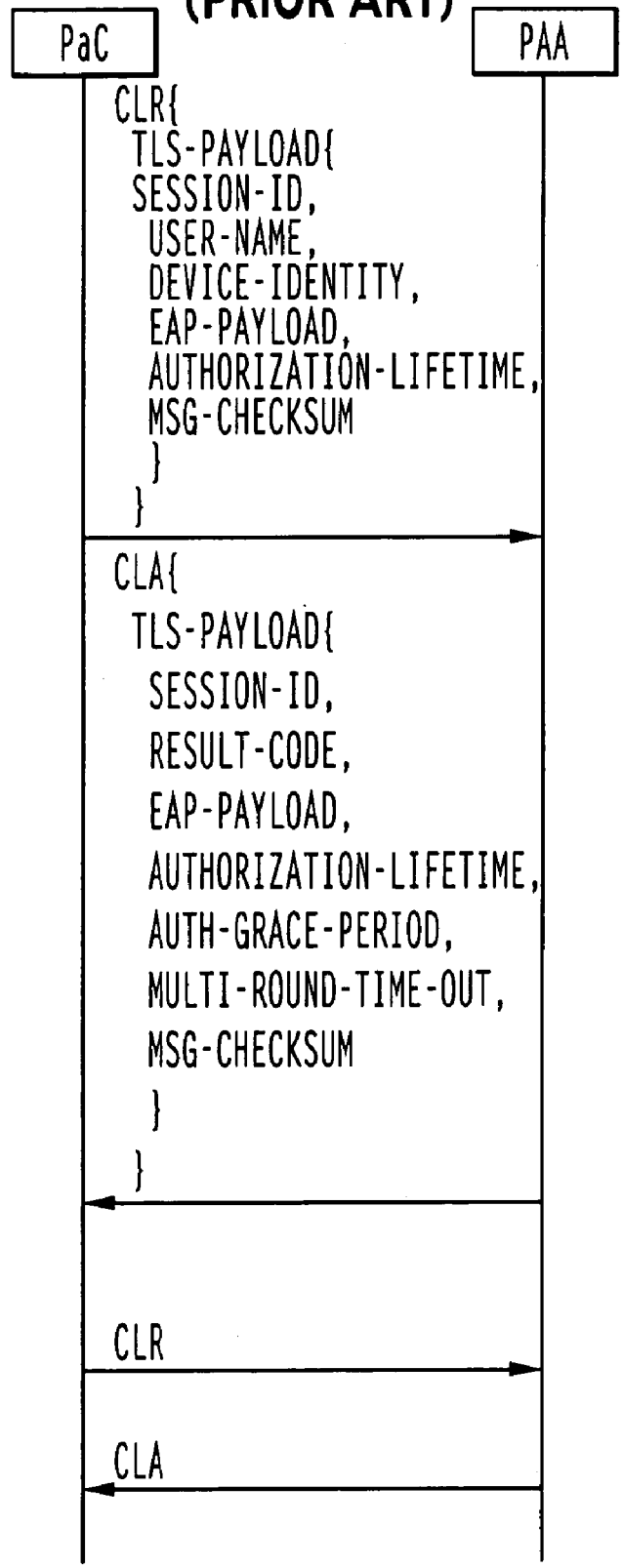

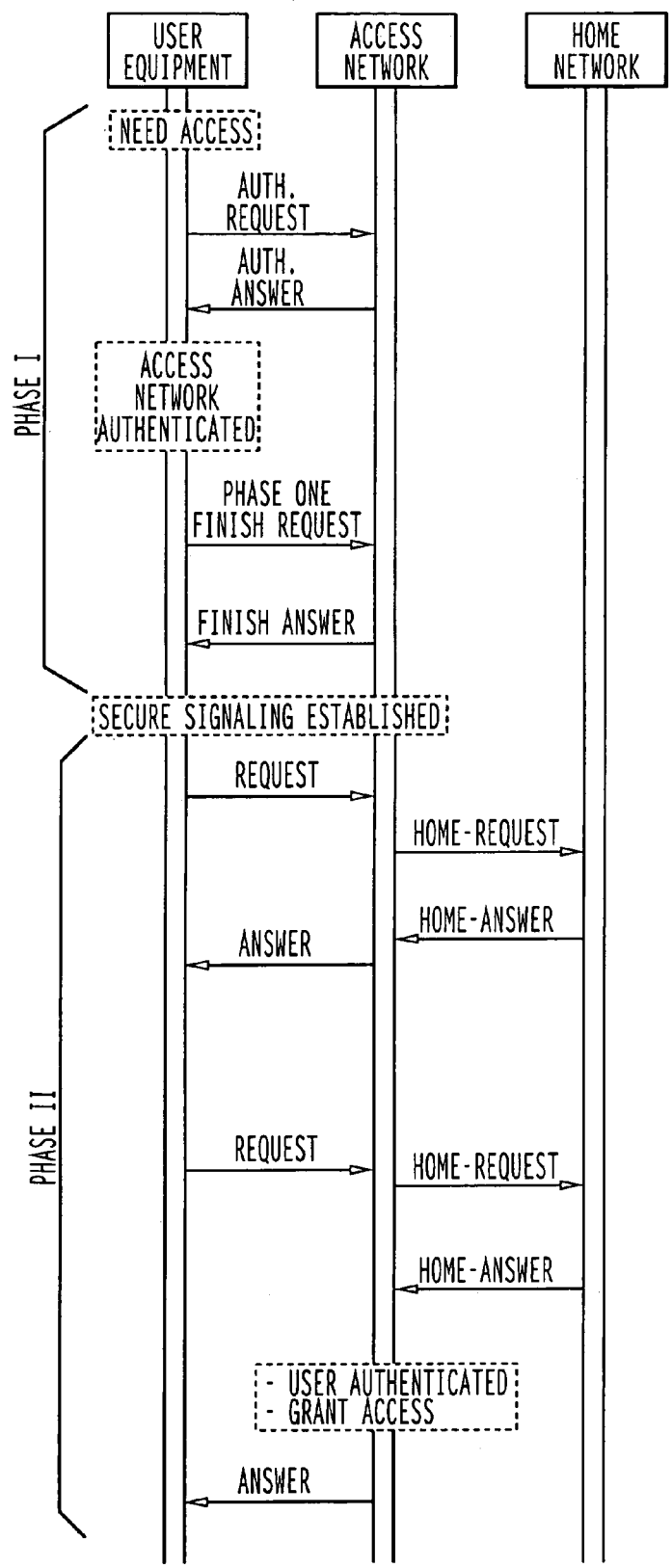

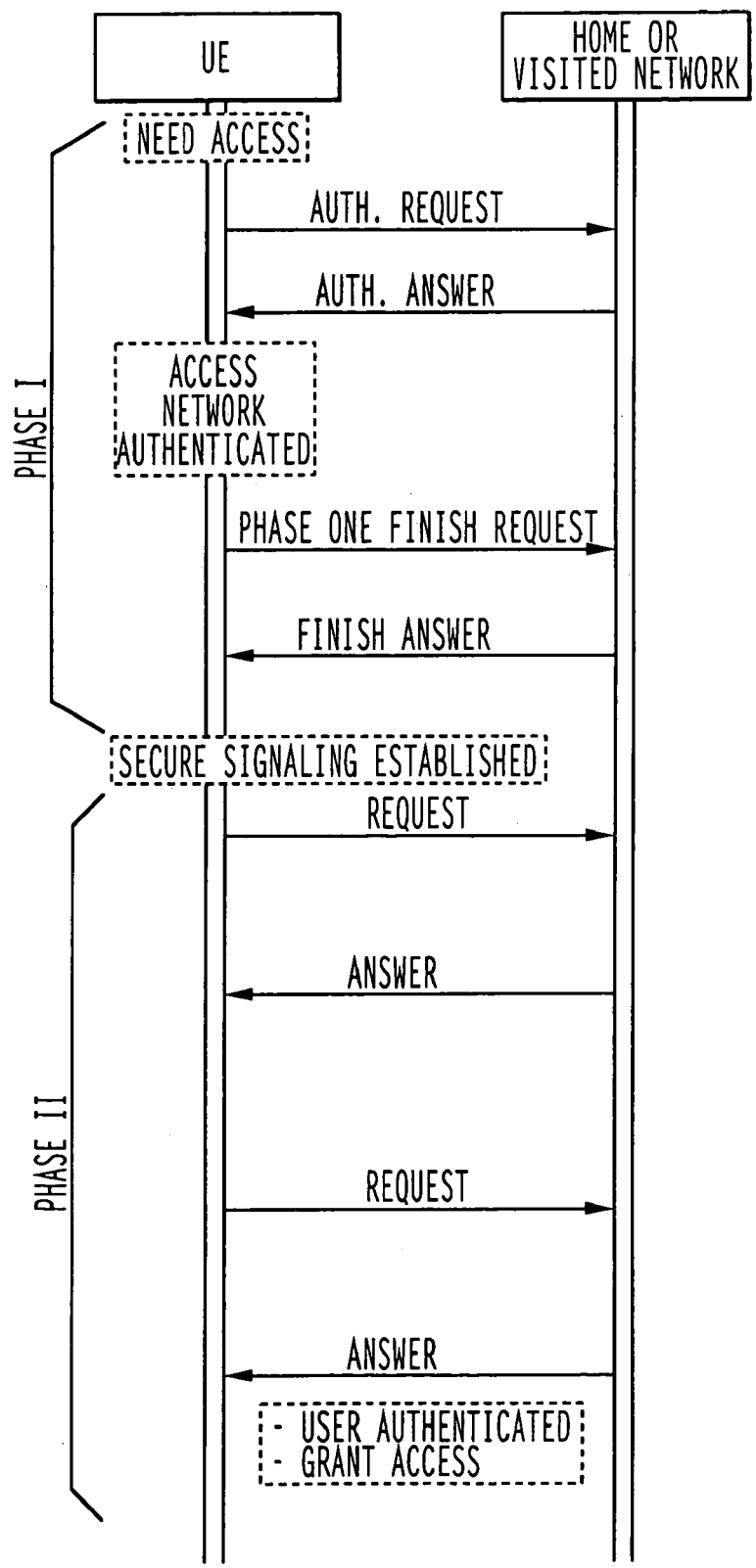

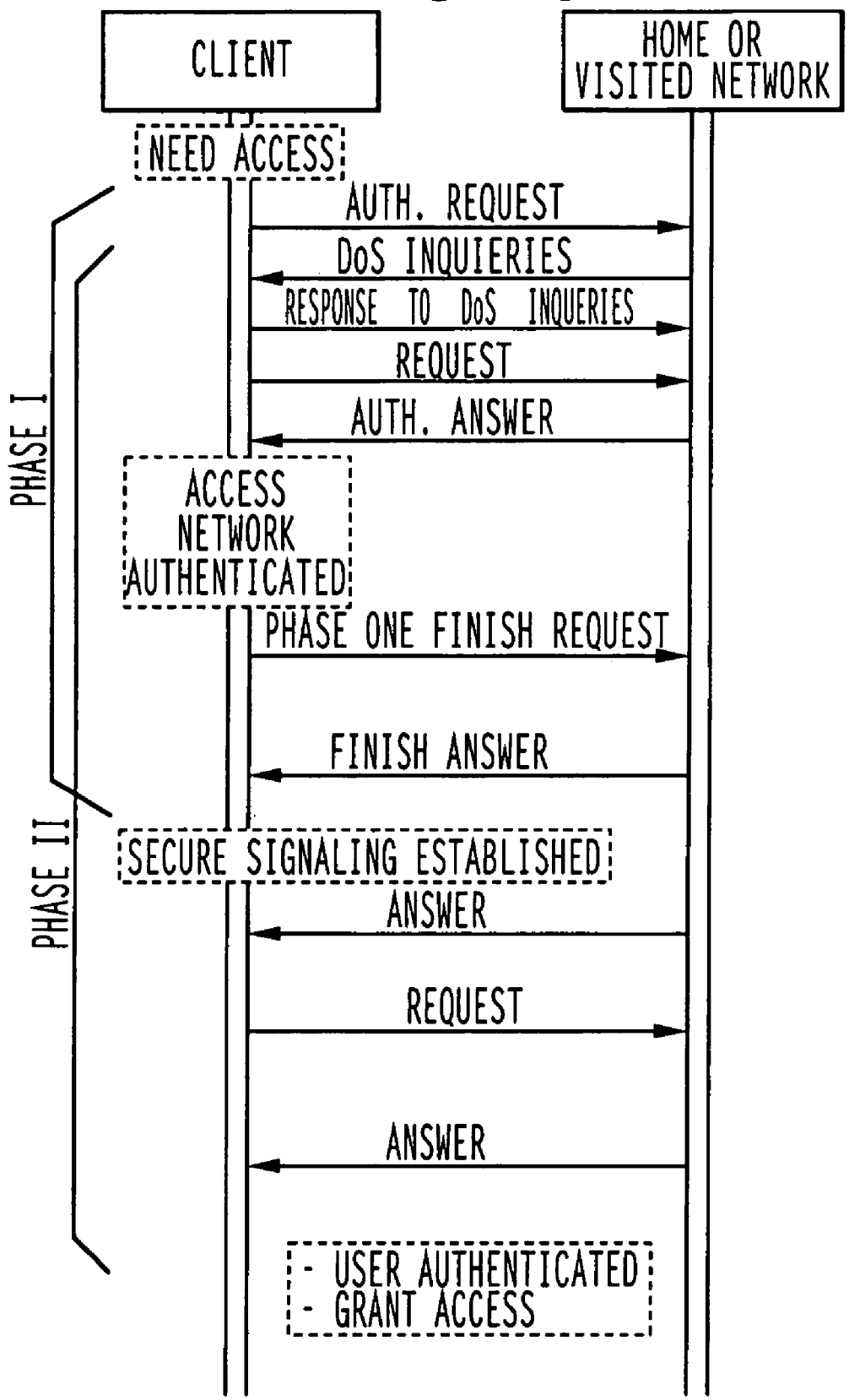

FASTER AUTHENTICATION WITH PARALLEL MESSAGE PROCESSING

CROSS-REFERENCE TO RELATED APPLICATION

This application claims the benefit of the filing date of Provisional Application Ser. No. 60/426,794, filed Nov. 18, 2002, entitled "Faster Authentication With Parallel Message Processing in SeNAA" which application is incorporated herein by reference in its entirety.

BACKGROUND OF THE INVENTION

Explanation of Abbreviations Used

| | |
|---|---|
| PANA | Protocol for carrying Authentication for Network Access Authentication |
| PAA | PANA Authentication Agent |
| PaC | PANA Client |
| TLS | Transport Level Security |
| EAP | Extensible Authentication Protocol |
| AAAH | AAA Home server |
| MN | Mobile Node |
| DoS | Denial of Service |
| SeNAA | Secure Network Access Authentication |
| LSA | Security Association |
| AAA | Authentication, Authorization and Accounting |

1. Field of the Invention

The invention relates to a method and a system for expediting in at least one network the establishment of a secure tunnel which provides connection between user equipment (UE) and one network entity and authenticating the user equipment with another network entity.

2. Description of the Prior Art

The IETF draft (draft-forsberg-pana-secure-network-access-auth-00.txt) presents a link layer independent network access authentication method, Secure Network Access Authentication (SeNAA), to support smooth interaction between user equipment (UE) and access networks while roaming. The draft authentication method has two phases, I and II. Phase I must be completed before phase II can be started. The serial message processing is slow.

FIG. 1 depicts the original (draft) version of the authentication protocol which was not adopted. Mobile terminals utilize different link layer technologies and roam between different layers. A generic link layer independent authentication and authorization method is needed to support smooth interaction between user equipment and access networks while roaming. User equipment network access authentication in different network technologies has become an important issue in the Internet. Different authentication methods already exist but are more or less link layer dependent.

Secure Network Access Authentication uses User Datagram Protocol (UDP) as the transport protocol. UDP is a lightweight protocol and allows application level implementations with port numbers UDP carries DIAMETER formatted Secure Network Access Authentication messages. Secure Network Access Authentication provides reliable request and response style message delivery (re-transmission and duplicate packet detection).

Secure Network Access Authentication does not assume a secure channel between Protocol for carrying Authentication for Network Access Authentication (PANA) Client (PaC) and PANA PANA Authentication Agent (PAA). Thus, on top of the Secure Network Access Authentication protocol Transport Level Security (TLS), a protocol is used to negotiate a Local Security Association (LSA) between PANA Client and PANA Authentication Agent. Transport Level Security provides authentication, privacy, integrity, and replay protection. Transport Level Security is used to protect Secure Network Access Authentication message AVPs and EAP between PANA Client and PANA Authentication Agent. AVPs that need protection are fed to the Transport Level Security Record layer, and the resulting encrypted and compressed data is stored into a TLS-Payload AVP. EAP protocol is carried inside an EAP-Payload AVP. Secure Network Access Authentication messages after successful Transport Level Security handshake are integrity protected with a check sum stored in the Msg-Checksum AVP. The AVP is protected with Transport Level Security Record layer.

Transport Level Security is also used for re-authentication between PANA Client and PANA Authentication Agent. Transport Level Security TLS supports mutual authentication and can optionally be used instead of EAP for user authentication. In all cases Transport Level Security is used for access network authentication. Secure Network Access Authentication messages carry information such as the PANA Client's Device Identifier (DI), that must be integrity protected. If PANA Authentication Agent supports DIAMETER and/or RADIUS Authentication Authorization and Accounting (AAA) back-end, signaling between PANA Client and PANA Authentication Agent can easily be extended to the back-end. Secure Network Access Authentication doesn't rely on any modifications to the EAP protocol. It provides secure transport up to the PANA Authentication Agent for EAP. Thus, any existing EAP methods can be used securely with Secure Network Access Authentication between PANA Client and PANA Authentication Agent. Security after PANA Authentication Agent is outside the scope of Secure Network Access Authentication. PANA Authentication Agent is assumed to get user authentication answer (Success or Failure) from the authenticator.

Secure Network Access Authentication utilizes protocols like EAP, TLS, UDP and IP that are assumed to exist in the PANA Client terminal already even without Secure Network Access Authentication. FIG. 2 illustrates an exemplary one. DIAMETER like message formatting and request response style reliability transport is one additional requirement for the PANA Client terminal and is provided with the Secure Network Access Authentication protocol. TCP and SCTP are considered too heavy weight transport protocols for Secure Network Access Authentication purposes (i.e. more message round trips needed).

Data protection, such as IP datagrams, is out of the scope of Secure Network Access Authentication. One possibility for further studies is to use the key material produced in the Transport Level Security handshake process with IPSec.

With reference to FIG. 1, successful mutual authentication is divided into two phases. In Phase I the network is authenticated, and the user is authenticated in Phase II.

Phase I consists of a Transport Level Security handshake as is shown in FIG. 3A which provides initial authentication with Transport Level Security to provide a secure tunnel. Local reauthentication, where PANA Client authenticates to PANA Authentication Agent, is in Phase I and is handled with Transport Level Security Session Resumption (illustrated in FIG. 3B which provides re-authentication with TLS). Access network authentication is based on access network certificates. How certificates are created, processed and verified is known and not described herein.

Phase II uses EAP for authenticating the user (FIG. 4 illustrates user authentication signalling with EAP being carried inside the EAP-Payload AVP). User authentication is bound to the DI, which is used to control access to the network.

With reference to FIG. 1, in Phase I, Server-Certificate-Request (SCR) message carries Client-Hello TLS message. Server-Certificate-Answer (SCA) carries the TLS answer which contains the Access Network certificate. PANA Client verifies the certificate. PANA Authentication Agent also adds a Session-Id AVP into the SCA message. This Session-Id is different from the Transport Level Security session-Id. The next messages must have the AVP included during the whole session. To finish the TLS handshake, PANA Client sends Client-Security-Association-Request (CSAR) message to the PANA Authentication Agent. PANA Authentication Agent answers with Client-Security-Association-Answer (CSM).

With reference to FIG. 1, in Phase I, Server-Certificate-Request (SCR) message carries Client-Hello TLS message. Server-Certificate-Answer (SCA) carries the TLS answer which contains the Access Network certificate. PaC verifies the certificate. PAA also adds a Session-Id AVP into the SCA message. This Session-Id is different from the TLS session-Id. The next messages must have the AVP included during the whole session. To finish the TLS handshake, PaC sends Client-Security-Association-Request (CSAR) message to the PAA. PAA answers with Client-Security-Association-Answer (CSAA).

When Transport Level Security is not used, a different User Datagram Protocol (UDP) port number (PAA UDP port <UDP-port3>, PaC UDP port <UDP-port4>) must be used for plaintext CLR/CLA message delivery. PANA Client can decide not to use Phase I authentication but must use Phase I authentication if <UDP-port3>is not reachable. Similarly if UDP port <UDPporti>is not reachable, PANA Client should try to use UDP port <UDP-port3>.

In Phase II, after a successful TLS handshake, PANA Client uses AAA-Client Request (CLR) message to start user authentication and DI authorization. CLR carries EAP-Payload AVP to PANA Authentication Agent. PANA Authentication Agent answers with AAA-Client-Answer (CLA) message with a Result-Code AVP. Result-Code informs PANA Client if multiple round trips are needed for completing the EAP authentication method or if the authentication (authorization) succeeded or failed.

PANA Client adds DI(s) thereof into the CLR message so that PANA Authentication Agent can verify the integrity of the DI and optionally provide it for the enforcement point.

PANA Authentication Agent can be co-located in the ARs or separated from the ARs. In case of separation, ARs act as relay agents to PANA Authentication Agent for MN. PANA Authentication Agent is in the same subnet as the AR and Mobile Node (Mn). When PANA Authentication Agent receives a message from Mobile Node through an AR, it must send the reply directly to the Mobile Node. When PANA Authentication Agent is separated from ARs, an AR should relay MN's Secure Network Access Authentication messages to the PANA Authentication Agent. When Mobile Node receives an answer from PANA Authentication Agent, the Mobile Node must send further requests to the PANA Authentication Agent directly.

Secure Network Access Authentication uses request and response style transactions. For each request a response is sent. If a response is not received in time, the request is re-sent. This mechanism is used for packet loss recovery. The received response works as an acknowledgment. Secure Network Access Authentication uses DIAMETER message formatting. The DIAMETER message header provides packet duplication (End-to-End Id) detection and request/response mapping (Hop-by-Hop Id).

To protect integrity of the DIAMETER header and the whole message, MAC is calculated over the DIAMETER message. The MAC is put into an AVP called Msg-Checksum. CLR/CLA messages use this AVP. PANA Client needs to be authenticated before network access is granted through the enforcement point (EP) in the access network.

Authentication and re-authentication initiator can be PANA Client or PANA Authentication Agent.

PANA Client starts re-authentication by sending CSAR message with Transport Level Security Client Hello in the TLS-Payload AVP to PANA Authentication Agent to UDP port<UDP-port1>(FIG. 3B). Similarly, PANA Authentication Agent initiates re-authentication by sending CSAA message with Transport Level Security Server Hello message in the TLS-Payload AVP to PANA Client to UDP port<UDP-port2>. The hello message contains the current Transport Level Security session specific id, which is used to detect session resumption from initial authentication. Re-authentication involves multiple CSAR/CSAA round trips.

After a Transport Level Security handshake or session, resumption is done and the SA is established PANA Client uses the Transport Level Security Record Layer to encrypt Secure Network Access Authentication message AVPs.

Secure Network Access Authentication doesn't assume connection-oriented links. Thus, Transport Level Security reauthentication is used for notifying PANA Authentication Agent of PANA Client'presence. Re-authentication interval is implementation specific<TBD?>.

Transport Level Security Alert, Handshake and Change cipher specification protocols are carried inside Transport Level Security Record Layer. For example if Transport Level Security Alert protocol reports a fatal error it is delivered with the next TLS-Payload AVP or with separate CSAR/CSM messages. The Secure Network Access Authentication application must understand the return codes from Transport Level Security Record Layer API functions. When fatal error is received, the Transport Level Security session is torn down. The Secure Network Access Authentication session MUST be re-negotiated.

Transport Level Security message formats can be found from Transport Level Security. The DIAMETER message header format and AVP format is known. SCA and CSM messages do not contain Result-Code AVPs.

---

Format of the SRC message:
<Server-Certificate-Request> ::= < Diameter Header: <TBD>, REQ, PXY>
{ User-Name }
{ TLS-payload }
TLS-Payload AVP contains the Transport Level Security handshake messages in the AVP data area as specified in [TLS]. The TLS-Payload AVP contains TLS-Client-hello.

```
        Format of the SCA message:
    <Server-Certificate-Answer> ::= < Diameter Header: <TBD>, PXY > <Session-Id>
            { TLS-payload }
        A Session-Id is generated for the PANA Client and delivered in the Session-
        Id AVP. The TLS-Payload AVP contains Transport Level Security Server-
        hello, Transport Level Security Server-Certificate,
TLS server-Key-Exchange, and Transport Level Security Server-Hello-Done
        messages. Format of the CSAR message:
    <Client-Security-Association-Request> :: <Diameter Header: <TBD>, REQ>
            <Session-Id>
            { TLS-payload }
        The Session-Id AVP is used in every SeNAA message between PANA Client
and PANA Authentication Agent.
        The TLS-Payload contains TLS-Client-Key-Exchange, TLS-Change-CipherSpec,
and TLS-Client-Finished messages.
        Format of the CSM message:
    <Client-Security-Association-Answer> ::= < Diameter Header: <TBD>, PxY>
            <Session-Id>
            { TLS-Payload }
```

The TLS-Payload contains TLS-Change-Cipher-Spec and TLS-ServerFinished messages.

```
        Format of the initial CLR message:
<AAA-Client-Request> :: <Diameter Header: <TBD>, REQ, PXY > [TLS-Payload:
        <Session-Id> { User-Name } { Device-Identity } [EAP-Payload]
        [Authorization-Lifetime]
        [Msg-Checksum]
        ]
        The TLS-Payload AVP data area contains encrypted AVPs through Transport
Level Security Record layer.
        Format of the CLA message from PANA Authentication Agent to PANA
        Client:
    <AAA-Client-Answer> ::= < Diameter Header: <TBD>, PXY> [TLS-Payload:
        <Session-Id> { Result-Code } [ EAP-payload ]
        [Authorization-Lifetime]
        [Auth-Grace-Period]
        [Multi-Round-Time-Out]
        [Msg-Checksum]
        ]
```

The TLS-Payload AVP data area contains encrypted AVPs through Transport Level Security Record layer.

The TLS-Payload AVP data contains encapsulated AVPs that are encrypted and compressed by Transport Level Security Record layer. Upon receive of TLS-Payload AVP the data area is first fed to the Transport Level Security Record layer to get the plain text AVP list for further processing.

The Msg-Checksum AVP data contains checksum of the whole DIAMETER message. Msg-Checksum is calculated over the message with MsgChecksum AVP data area bits set to zero. Checksum algorithm is<TBD>.

The CLA message contains Transport Level Security protected Result-Code AVP. In Secure Network Access Authentication one of the following Result-Code values is possible.

DIAMETER_MULTI_ROUND_AUTH 1001
    EAP user authentication requires more round trips.
DIAMETER_SUCCESS      2001
    EAP user authentication and network access authorization successful.
DIAMETER_AUTHENTICATION_REJECTED 4001
    EAP user authentication failure.

Secure Network Access Authentication provides reliable request and response style transactions. Peer which initiates the transaction is responsible for re-transmission if the corresponding response is not received in<TBD-msec1>milliseconds. Maximum number of retries is<TBD-retries1>.

If Multi-Round-Time-Out AVP is included in a Secure Network Access Authentication message from PANA Authentication Agent to PANA Client, the re-transmission (same Hop-by-Hop Id and End-to-End Id) MUST not exceed this time limit.

UDP Port number(s) must be defined. SCR/SCA, CSAR/CSM and CLR/CLA message command codes must be assigned. Msg-Checksum and TLS-Payload AVP codes must be assigned.

FIG. I as described above illustrates the use of DIAMETE-EAP authentication. In the first step, the EAP client is requested to initiate the authentication procedure. Normally, the client (EAP peer) authentication is requested by the EAP authenticator or an access point, but one round-trip of EAP messages is saved when the client device, which comprises the EAP client, initiates the authentication request (EAP Request (Identity)). The EAP client responds to the request and provides an identity in the response message.

In the next step, the client or user equipment request the server in the access network (access router) to authenticate itself. The client sends a message (client hello in this embodiment where Transport Level Security is used) to the server, the message containing a session ID and information on the client'supported cryptographic algorithms. The client can indicate in the message, from which certifying authority it wishes the server to acquire its security certificate. The server responds with a server hello message, indicating the selected encryption/validation algorithm, as well as provides a security certificate to the client. The next messages conclude Phase I, establishing a secure connection between the client and the server in the access network. Both the client and the server send a finished message to confirm that the key exchange and authentication were successful.

In Phase II, the client authentication stage, uses the secure connection established between the client and the server for exchanging authentication information with an authentication server. The client sends an authentication request, which is to be passed on to the authenticator by the access point server. The message contains, for example, the client ID which the client received from the EAP peer in the first step. The server in the access network forwards the authentication request to the AAA home server, which in turn forwards the EAP response (received from the EAP peer/client in step 1) to the EAP authenticator. In the next step, the EAP authenticator indicates that it is not satisfied with the client's identity information only, but requires an additional authentication round. The EAP authenticator sends an EAP request toward the client with a 'multi-round' result code, which indicates, that an additional round trip is required for authentication. The EAP authenticator indicates in the EAP request sent toward the client, which type of further authentication is requested from the client. The message is then forwarded through the AAA infrastructure to the EAP client, which creates the required response to the authentication request and sends the response back toward the EAP authenticator through the AAA infrastructure. When the EAP authenticator receives the client's response, it checks whether the response was as expected, and in case of a valid response, the EAP sends a message indicating successful authentication toward the client.

FIG. 5 illustrates a prior art diagram of a generic system and process in which serial processing involving phases I and II, like FIG. 1, is illustrated between UE, an access network and a home network which may be an AAA home network. Phase I represents the establishment of a secure tunnel between the UE and the access network and Phase II represents authentication of the UE with the home network. As may be seen, the establishment of a secure connection (Phase I) precedes the authentication of the UE (Phase II) in the home network. This serial process has the resultant time delay.

FIG. 6 illustrates a prior art diagram of a generic system and process in which serial processing involving Phases I and II, like FIG. 1 and, is illustrated between a UE and one of either a home network or a visited network network. Like the processing described above in conjunction with FIGS. 1 and 5, the processing is serial involving Phases I and II with the attendant time delay. A single network entity in the home or visited network is the point of exchange with the Request and Answer messages involving Phases I and II.

First, the UE or client requests the access network server to authenticate itself, the server provides the client with its security certificate, and the key exchange and authentication is confirmed by "finished" messages sent by both the client and the server. The client sends an authentication request through the network infrastructure which may be an AAA architecture toward the authentication server, the authentication server challenges the UE to provide additional authentication information, and once the server receives a valid response to its challenge from the UE, the server sends a message indicating successful authentication toward the UE through the infrastructure.

SUMMARY OF THE INVENTION

The present invention is a method and a communication system for connecting a client or UE to at least one network including network entities. With the invention, authenticating the client or UE with one network entity occurs at least partially simultaneously (partially in parallel) with the establishing of a secure tunnel. The authentication of the UE may start at the same time as the establishing of the secure tunnel or thereafter to be only partially simultaneous therewith. This methodology provides time savings.

The present invention in first and second embodiments combines authentication phases I (TLS) and II (EAP Over DIAMETER) with parallel message processing to obtain a faster authentication process in SeNAA. In one embodiment with maximum overlap, a possibility of an easy DoS attack against AAAH exists. In another embodiment, with less than totally simultaneous processing when a DoS attack is detected, the level of vulnerability to the DoS attack is decreased. The embodiment with maximum overlap of Phase I and II is the fastest solution, but the other embodiment with partial overlap is still faster than the prior art draft version illustrated in FIG. 1 and provides protection against DoS.

Moreover, when the overlap between the establishing of the secure tunnel and the authenticating of the UE is partial, with the establishing of the secure tunnel being established first, at least one network communicates with the UE to confirm that the request from the UE for a secure tunnel is not part of a DoS attack. The communication during the overlap time may include at least one of a request for an identification of the UE and a request for capability of the UE to support at least one data protocol.

A used herein a network entity may be a physical or logical entity, such as without limitation, a server.

As used herein, the home network is the network with billing responsibility for the UE.

In a communication system comprising at least one network, including network entities which provide connectivity to user equipment, a method of connecting the user equipment to the at least one network in accordance with the invention includes establishing a secure tunnel which provides connection between the user equipment and one of the network entities; and authenticating the user equipment with another of the network entities; and wherein the authenticating of the user equipment with the another of the network entities occurs at least partially simultaneously with the establishing of the secure tunnel. The establishing the secure tunnel and the authenticating the user equipment with the network may begin simultaneously or begin before the authenticating the user equipment with the network. During a time between a beginning of the establishing the secure tunnel with the one of the network entities and a beginning of the authenticating the user equipment with the another of the network entities, the at least one network may communicate with the user equipment to confirm that the request from the user equipment to establish a secure tunnel is not part of a denial of service attack. The communication during the time may include at least one of a request for an identification of the user equipment and a request for capability of the user equipment to support at least one data protocol. The one network entity may comprise a server and the another network entity may comprise a server. In an access network which provides connection of the user equipment to the network, the secure tunnel may be established between the user equipment and the access network and the one network entity may be part of the access network. The user equipment may be wirelessly connected to the at least one network. The at least one network may comprise an access network and a home network, or a visited network A communication system in accordance with the invention includes at least one network, including network entities which provide connectivity to user equipment and wherein a secure tunnel is established which provides connection between the user equipment and one of the network entities, the user equipment is authenticated with another of the network entities, and the authenticating of the user equipment with the another of the network entities occurs at least partially simultaneously with the establishing of the secure tunnel. The establishing the secure tunnel and the authenticating the user equipment with the network may begin simultaneously or begin before the authenticating the user equipment with the network. During a time between a beginning of the establishing the secure tunnel with the one of the network entities and a beginning of the authenticating the user equipment with the another of the network entities, the at least one network may communicate with the user equipment to confirm that the request from the user equipment to establish a secure tunnel is not part of a denial of service attack. The communication during the time may include at least one of a request for an identification of the user equipment and a request for capability of the user equipment to support at least one data protocol. The one network entity may comprise a server and the another network entity may comprise a server. In an access network which provides connection of the user equipment to the network, the secure tunnel may be established between the user equipment and the access network and the one network entity may be part of the access network. The user equipment may be wirelessly connected to the at least one network. The at least one network may comprise an access network and a home network, or a visited network The invention further is a user equipment in a communication system comprising at least one network, including network entities which provide connectivity to the user equipment and wherein: a secure tunnel is established which provides connection between the user equipment and one of the network entities, the user equipment is authenticated with another of the network entities, and the authenticating of the user equipment with the another of the network entities occurs at least partially simultaneously with the establishing of the secure tunnel. The establishing the secure tunnel and the authenticating the user equipment with the network may begin simultaneously before the authenticating the user equipment with the network. During a time between a beginning of the establishing the secure tunnel with the one of the network entities and a beginning of the authenticating the user equipment with the another of the network entities, the at least one network may communicate with the user equipment to confirm that the request from the user equipment to establish a secure tunnel is not part of a denial of service attack. Communication during the time may include at least one of a request for an identification of the user equipment and a request for capability of the user equipment to support at least one data protocol. The one network entity may comprise a server and the another network entity comprises a server. An access network may provide connection of the user equipment to the network and the secure tunnel may be established between the user equipment and the access network and the one network entity may be part of the access network. The user equipment may wirelessly be connected to the at least one network. The access network may communicate with the user equipment to confirm that the request from the user equipment to establish a secure tunnel is not part of a denial of service attack.

BRIEF DESCRIPTION OF THE DRAWINGS

FIG. 2 illustrates the prior art SeNAA protocol stack in PaC.

FIG. 3A illustrates the prior art initial authentication of FIG. 1 with TLS.

FIG. 4 illustrates user authentication signalling of FIG. 1 with EAP being carried inside EAP-Payload AVP.

FIG. 5 illustrates a generic prior art diagram of serial establishment of a secure tunnel and authentication of UE in a system including a UE, an access network and a home network which may be an AAA network.

FIG. 6 illustrates a generic prior art diagram of serial establishment of a secure tunnel and authentication of a UE in a system including UE and one of a home network or visited network.

FIGS. 13-18 respectively illustrate the modification of the embodiments of FIGS. 7-12 to include protection against DoS attacks.

Like parts or signal flows are identified identically throughout the drawings.

DESCRIPTION OF THE PREFERRED
EMBODIMENTS OF THE INVENTION

Figure 1:
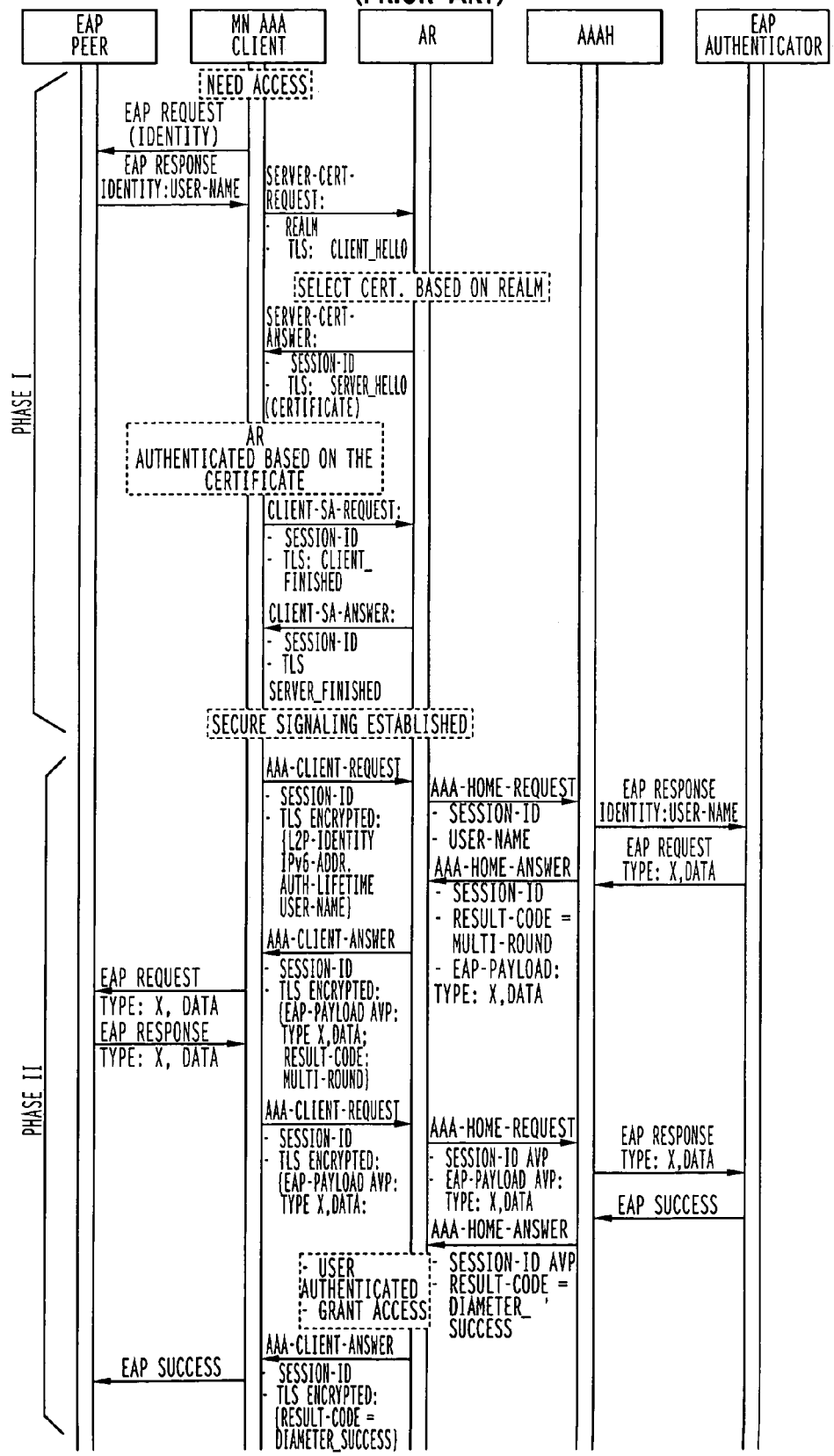
FIG. 1 illustrates the prior art serial establishment of a secure tunnel and authenticating a client using a DIAMETER-EAP authentication.
Figure 3B:
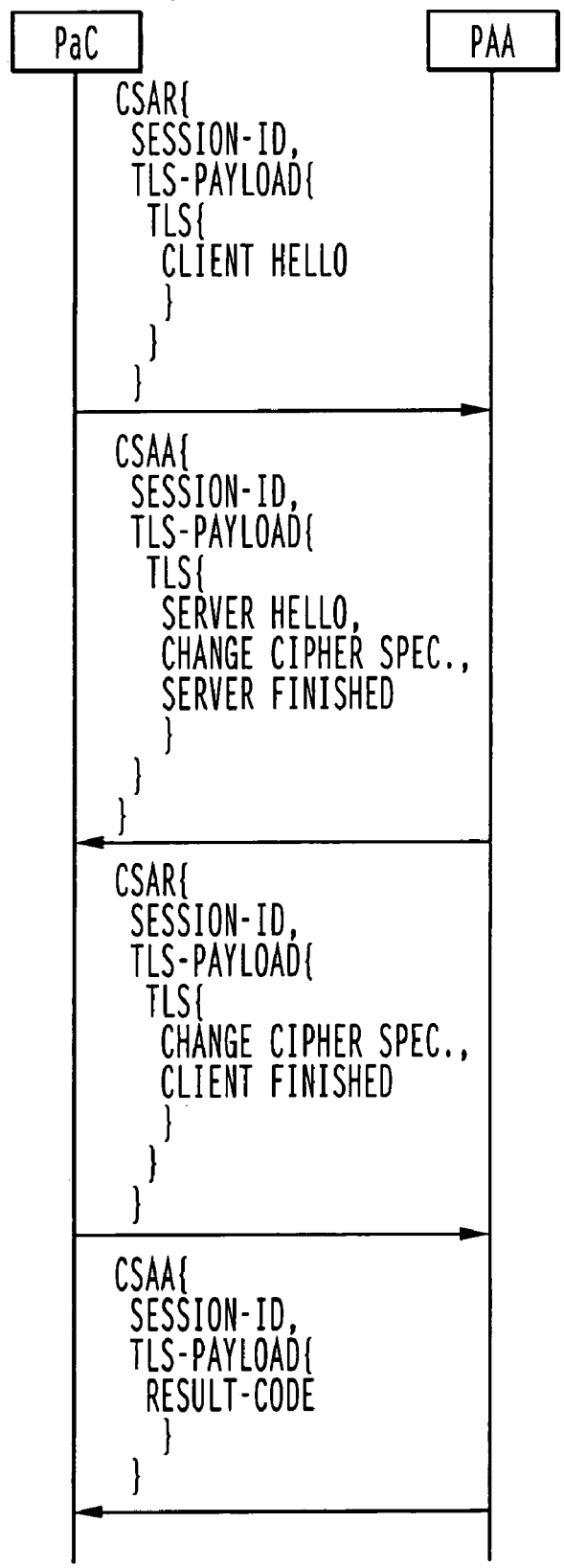
FIG. 3B illustrates the prior art re-authentication of FIG. 1 with TLS.
Figure 7:
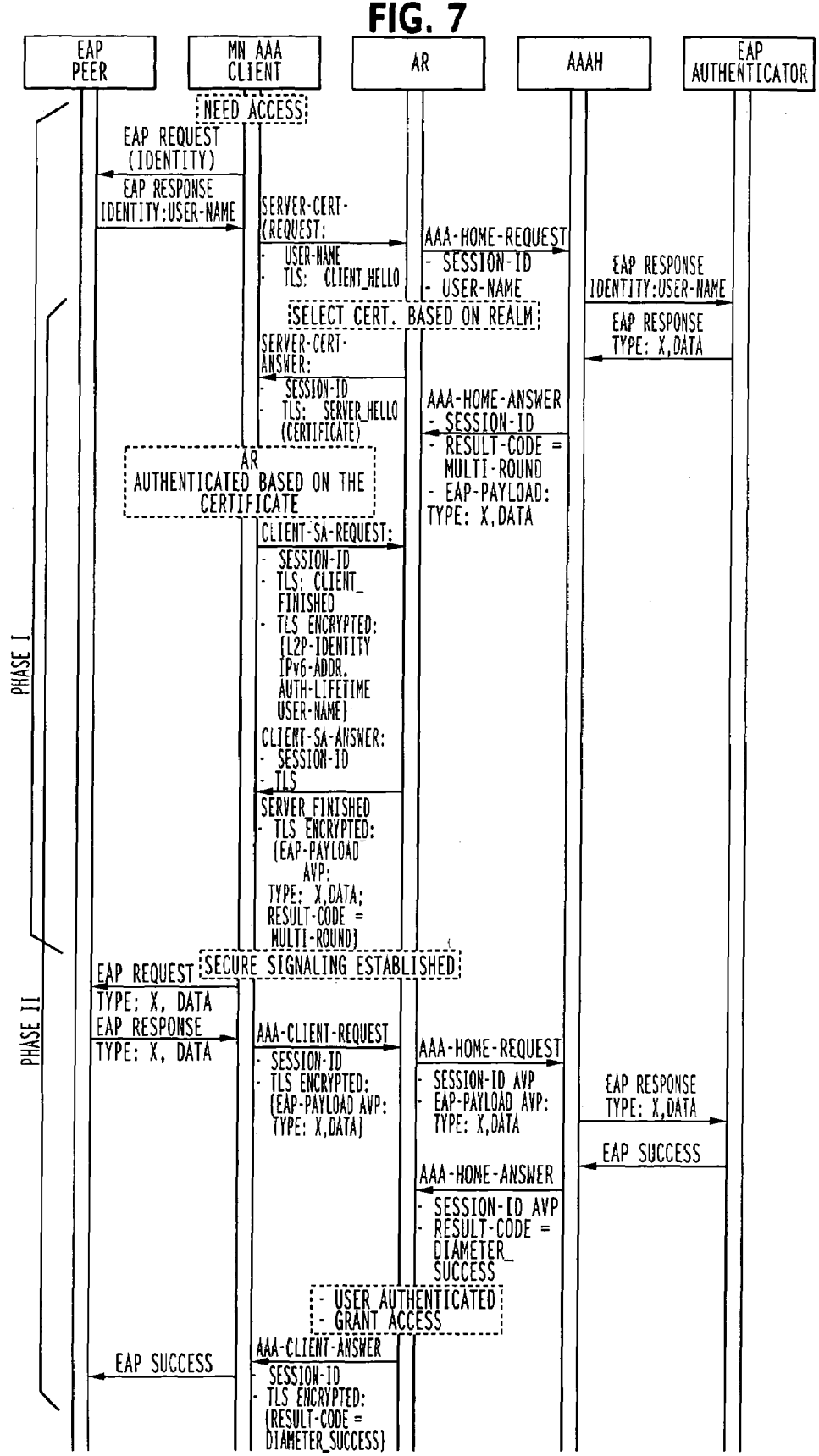
FIGS. 7 and 8 illustrate first and second embodiments of the invention which improve the prior art serial processing of FIG. 1 by providing for at least some simultaneous processing of the establishment of the secure tunnel and authentication of the user.
Figure 8:
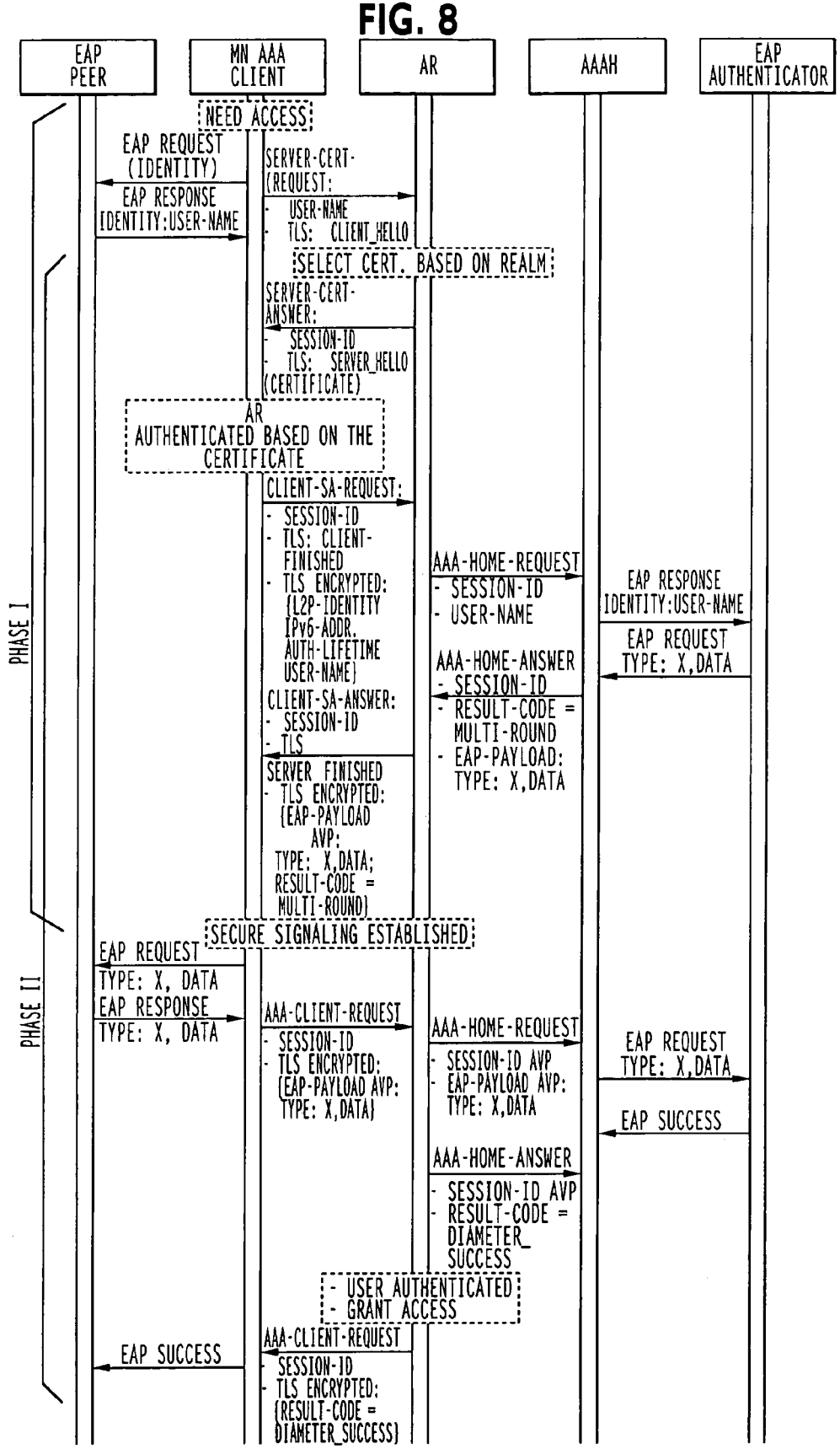

FIGS. 7 and 8 illustrate first and second embodiments of the invention which improve the speed of establishing a secure tunnel and authentication of the user by using at least partial simultaneous processing of the establishment of the secure tunnel (Phase I) and the establishment of authentication of the user (Phase II) when compared to the prior art of FIG. 1. The specific signal flows that are separately illustrated as parts of Phases I and II, may be combined into a single message where possible. The individual signal flows are identical to the prior art of FIG. 1 and are not hereafter described. The first embodiment of FIG. 7 has a greater degree of signal processing overlap than the second embodiment of FIG. 8. FIG. 7 depicts an optimized parallel message processing solution for the prior art of FIG. 1 with maximum overlap. FIG. 8 depicts the optimized solution, when a DoS attack against AAAH has been detected with less than maximum overlap to permit return signalling to the UE to request an identification of the UE, a request of the capability of the UE or other prior art signalling to determine if a DoS attack is occurring.

Figure 9:
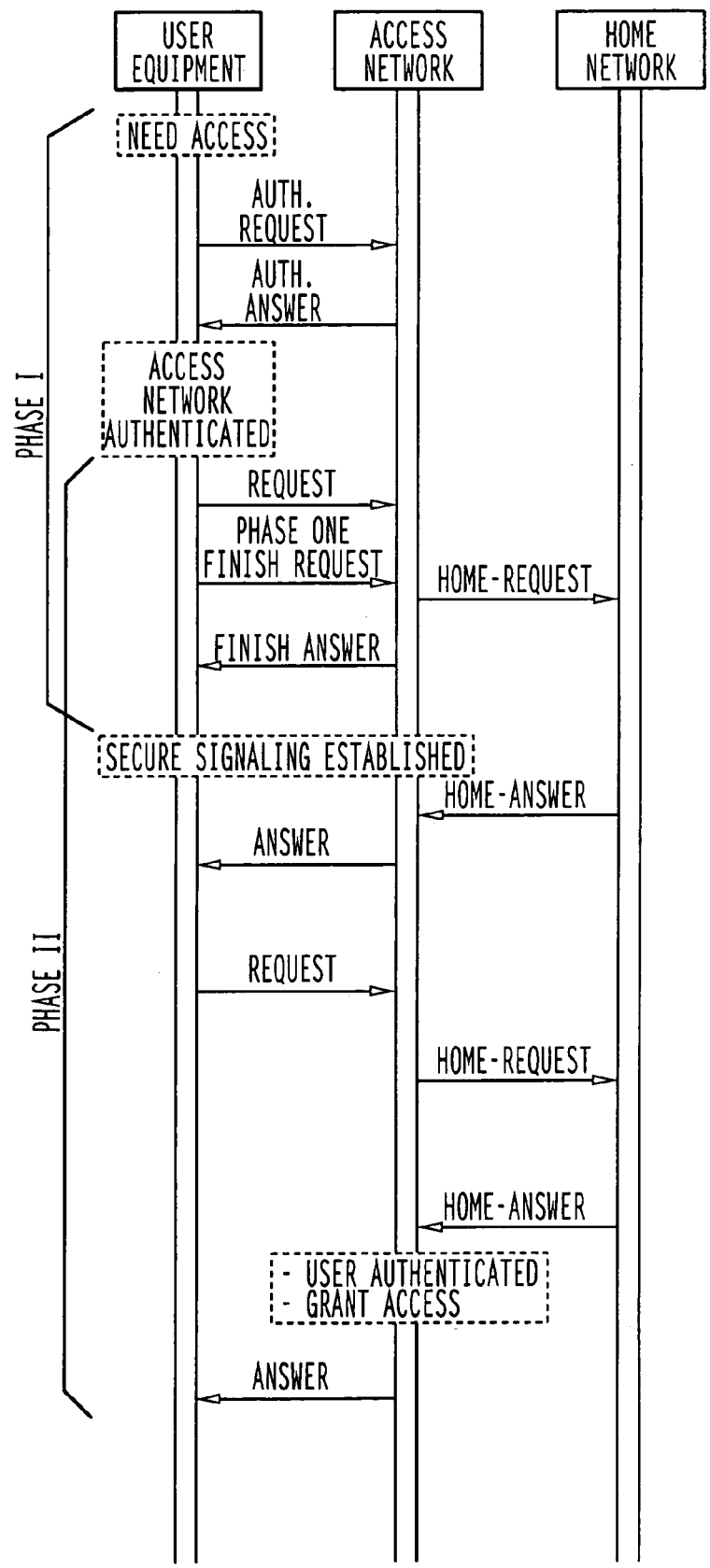
FIGS. 9 and 10 illustrate third and fourth embodiments of the invention which improve the prior art processing of FIG. 5 by providing for at least some simultaneous processing of the establishment of the secure tunnel and authentication of the user.
Figure 10:
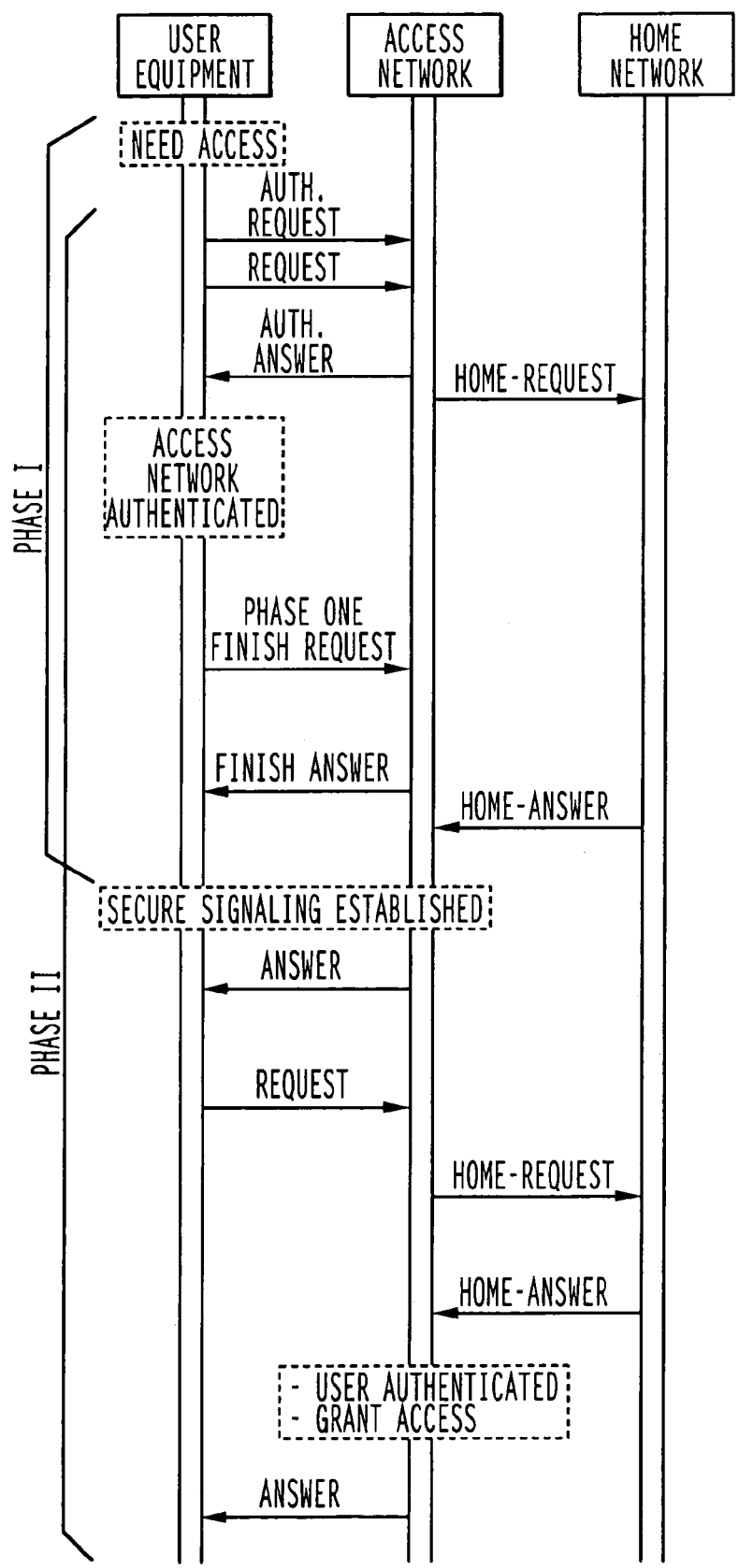

FIGS. 9 and 10 illustrate third and fourth embodiments of the invention which improve the speed of establishing a secure tunnel and authentication of the user by using at least partial simultaneous processing of the establishment of the secure tunnel (Phase I) and the establishment of the authentication of the user (Phase ii) when compared to the prior art of FIG. 5. The specific signal flows, that are separately illustrated as parts of Phases I and II, may be combined into a single message where possible. The individual signal flows are identical to the prior art of FIG. 5 and are not hereafter described. The embodiment of FIG. 10 has a greater degree of signal processing overlap than the embodiment of FIG. 9.

Figure 11:
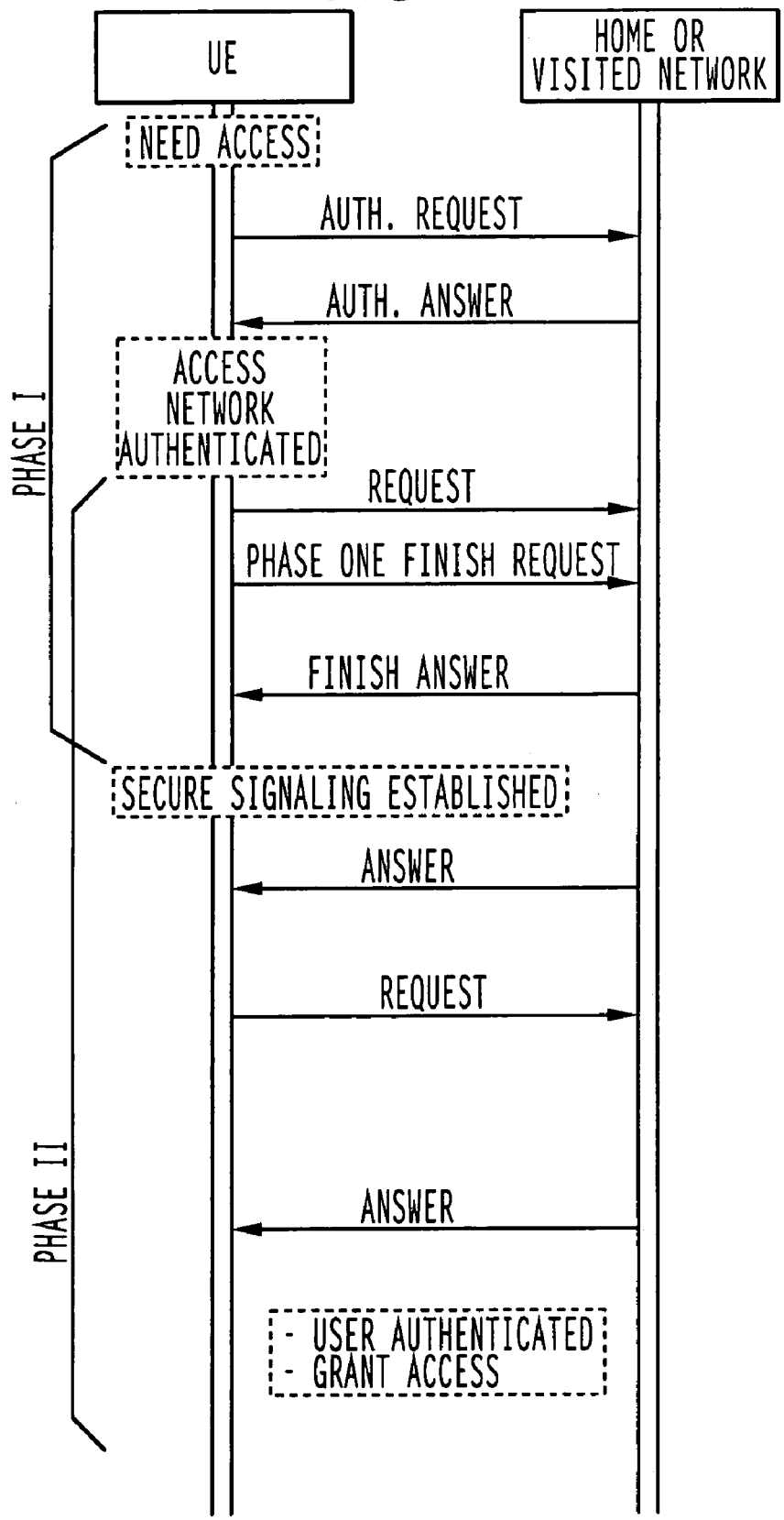
FIGS. 11 and 12 illustrate fifth and sixth embodiments of the invention which improve the prior processing of FIG. 6 by providing for at least some simultaneous processing of the establishment of the secure tunnel and authentication of the user.
Figure 12:
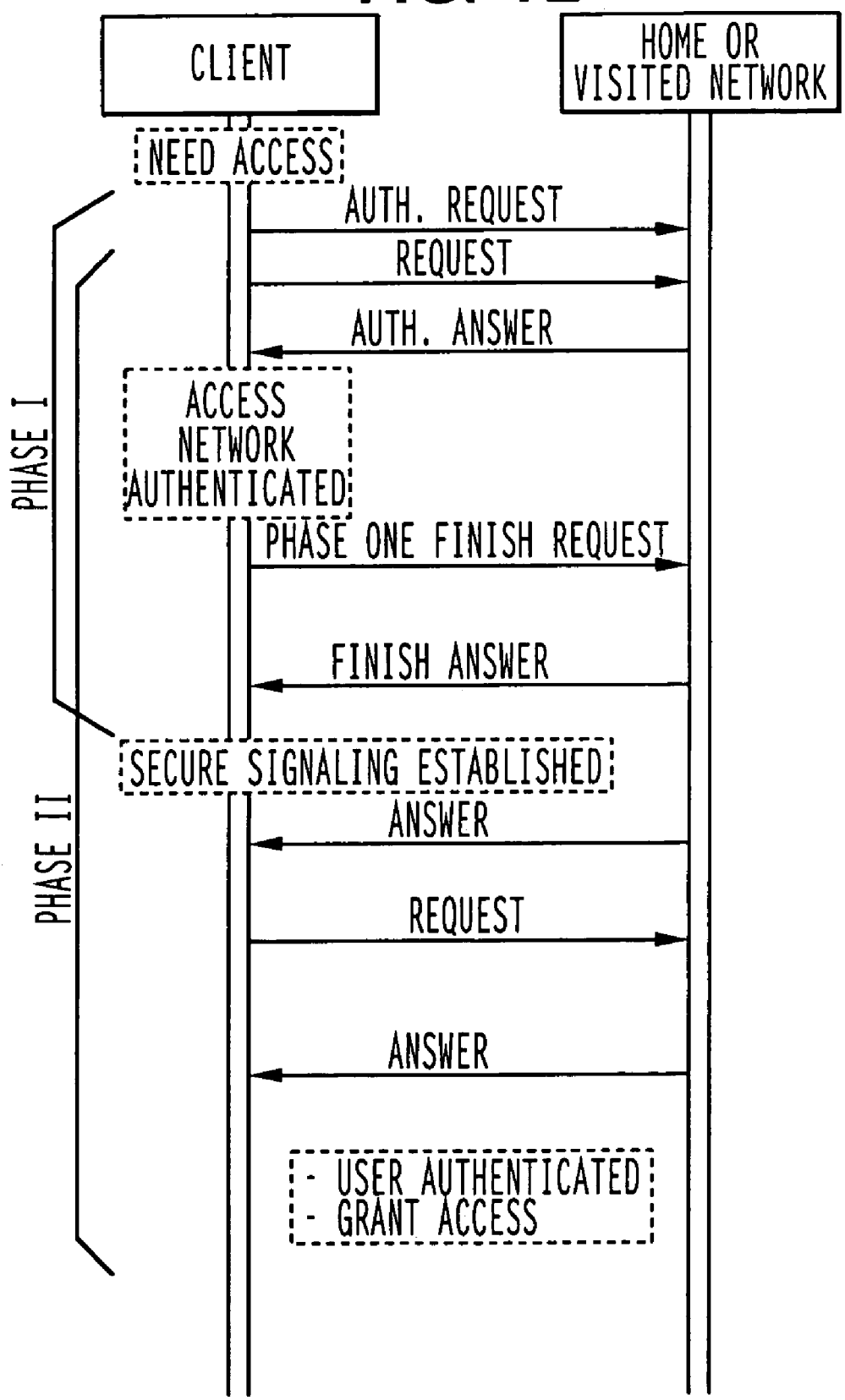
Figure 13:
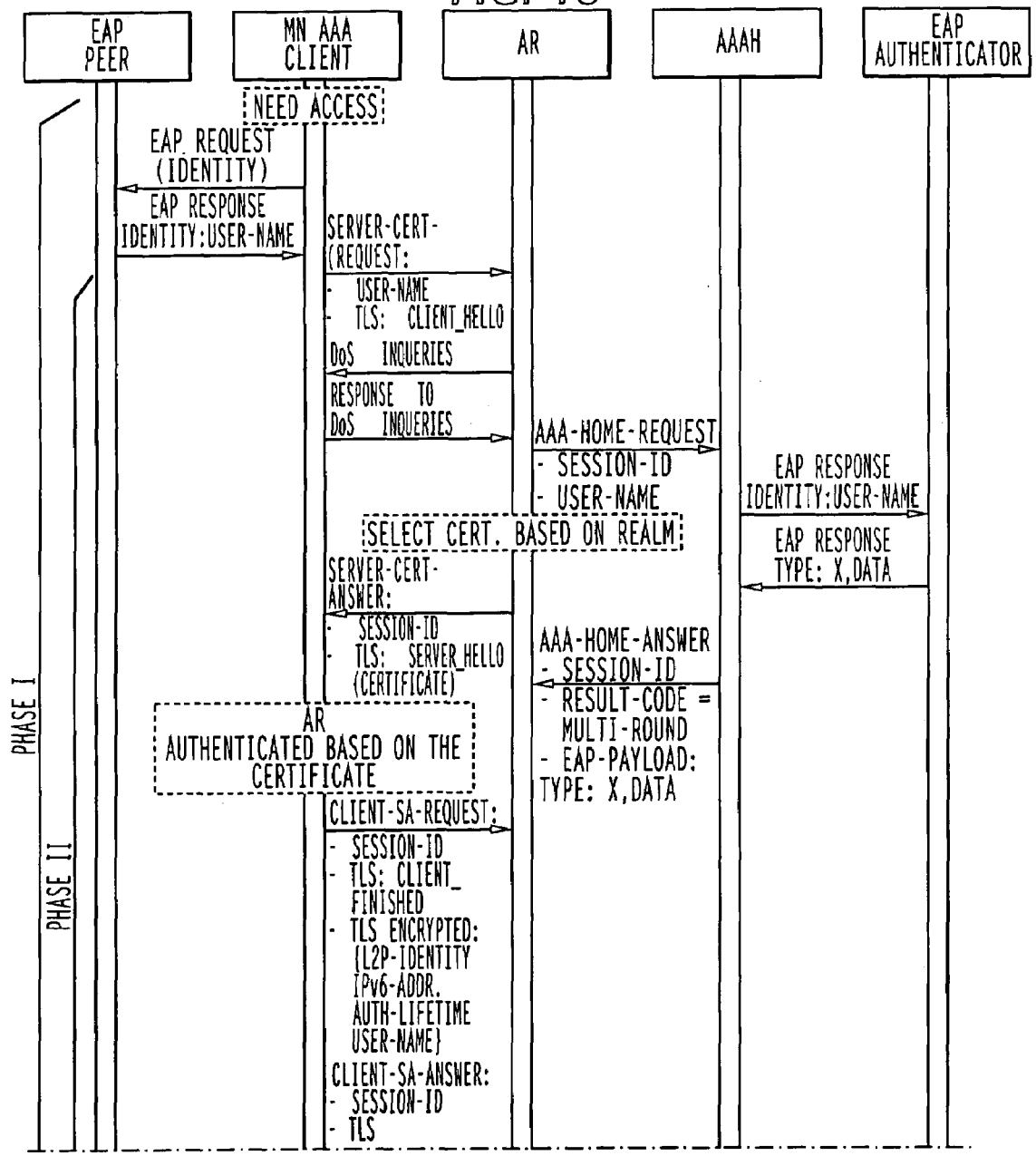
Figure 14:
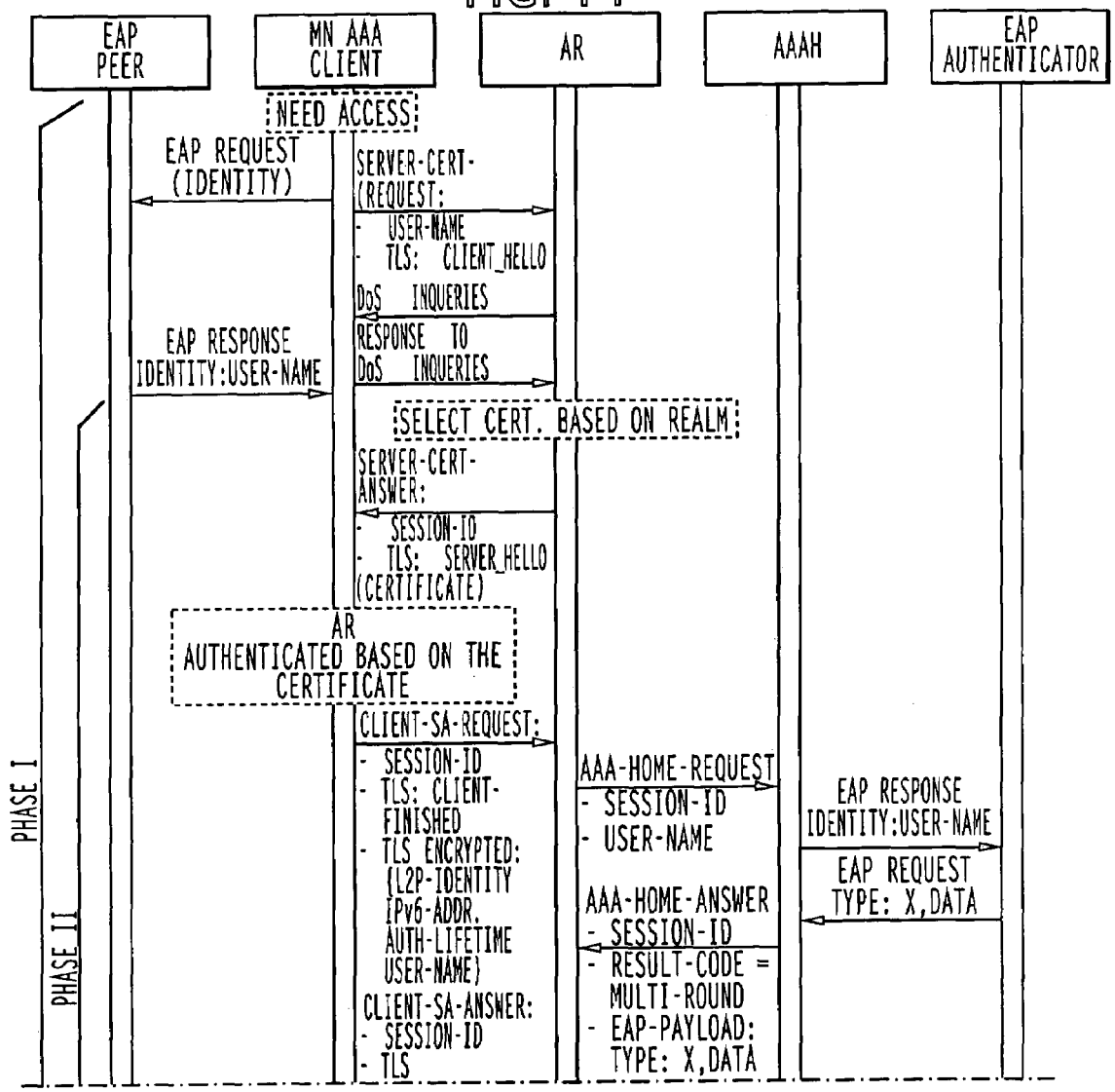
Figure 15:
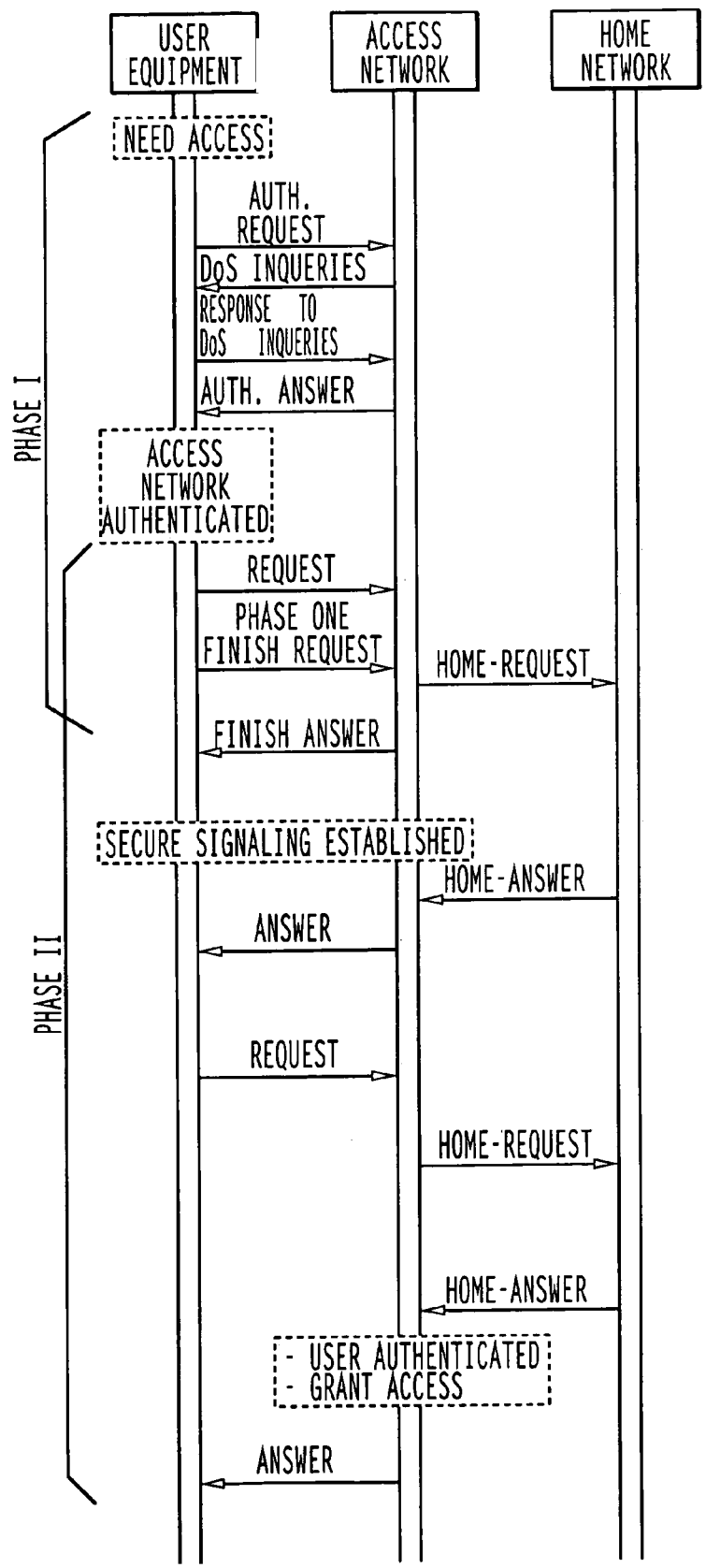
Figure 16:
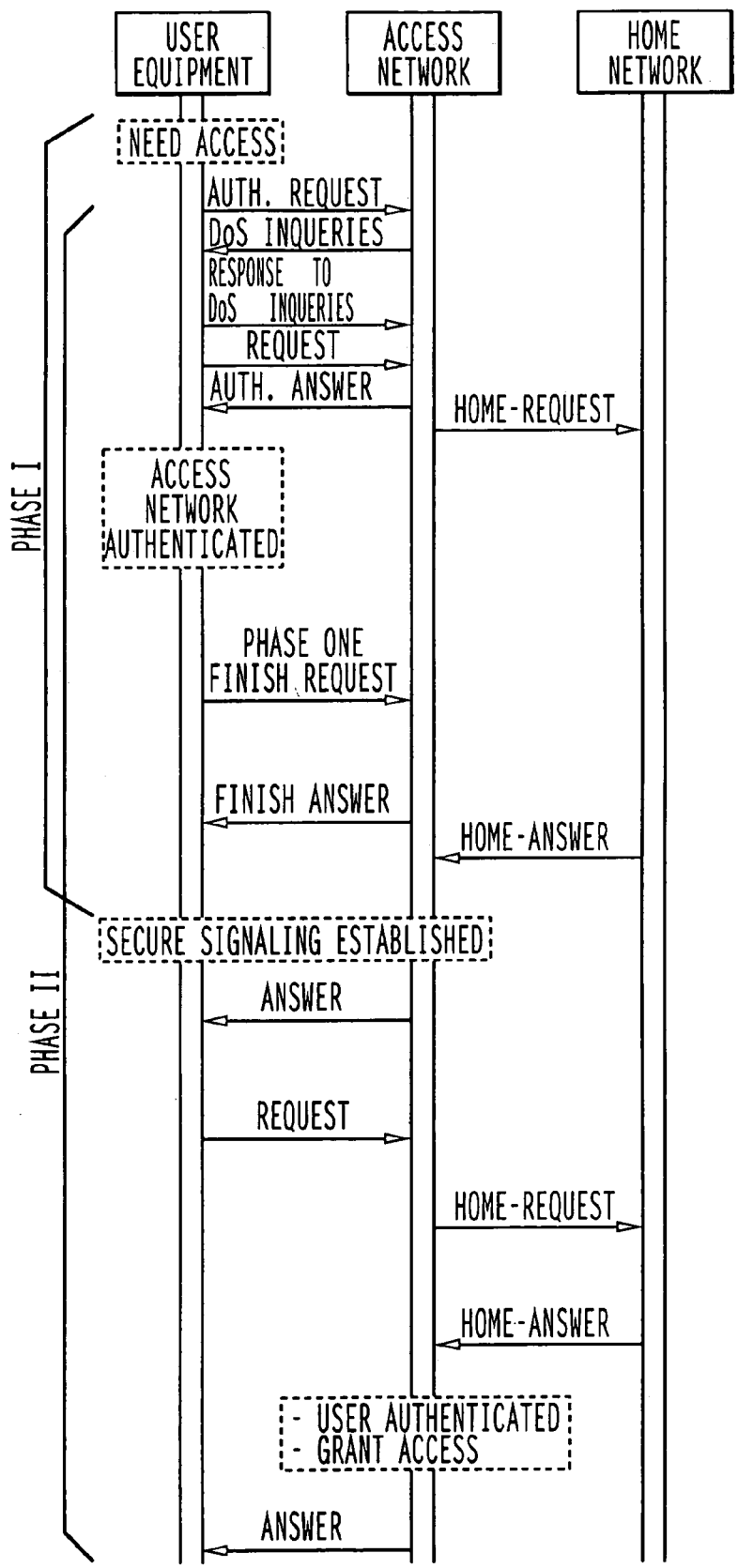
Figure 17:
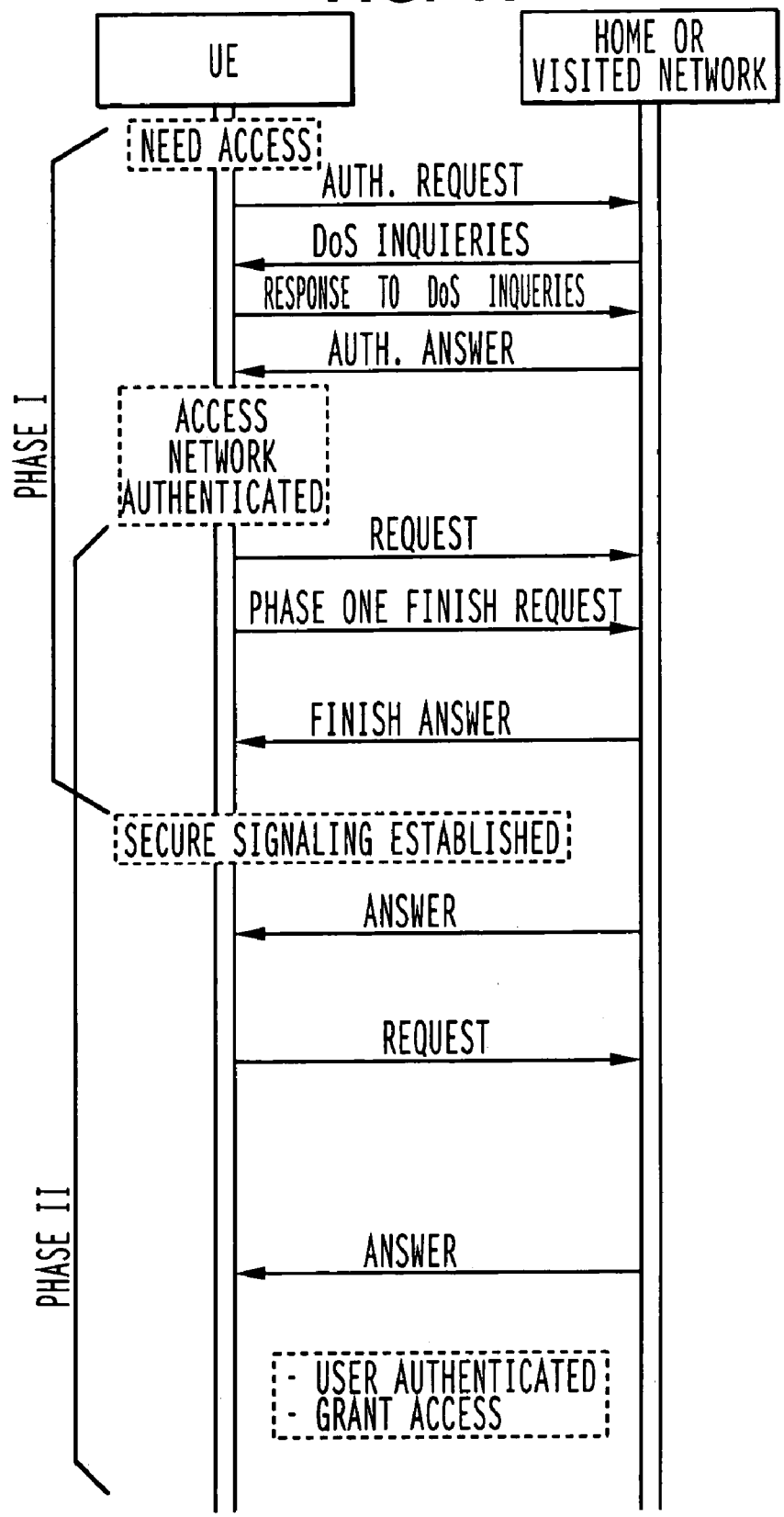

FIGS. 11 and 12 illustrate fifth and sixth embodiments of the invention which improve the speed of establishing a secure tunnel and authentication of the user by using at least partial simultaneous processing of the establishment of the secure tunnel (Phase I) and the establishment of the authentication of the user (Phase II) when compared to the prior art of FIG. 6. The specific signal flows, that are separately illustrated as parts of Phases I and II, may be combined into a single message where possible. The individual signal flows are identical to the prior art of FIG. 6 and are not hereafter described. The embodiment of FIG. 12 has a greater degree of signal processing overlap than the embodiment of FIG. 11.

Each of the home and/or visited networks of the six embodiments of the invention include separate network entities (not illustrated) within the home and/or visited network at which the establishment of the secure tunnel and authentication of the user are terminated.

The embodiments of FIGS. 13-18 represent the modification respectively of the embodiments of FIGS. 7-12 to mitigate against DoS attack vulnerability during the authentication phase (Phase I) involving the client or UE computing and storing state information. FIGS. 13-18 respectively modify the embodiments of FIGS. 7-12 to include a DoS Inquiry and a Response to DoS Inquiry to provide protection against DoS attacks. If the second phase (Phase II) is started at the same time as the first phase (Phase I), namely at the occurrence of the first message from the client or UE to the network, the network elements that are involved with the second phase authentication are more easily involved with DoS signalling. Dynamic DoS attack prevention is used to protect the network entities involved in the second phase from malicious users providing flooding packets. The method for doing this is to start the second phase later and later depending on the malicious packet signalling. This makes the DoS attack against the second phase network entity harder, because the malicious client or UE has to do more in the first phase before second phase is started. Ultimately, the system can fall back to the state, where Phase I is completely finished before the second phase starts, as in the prior art of FIGS. 1, 5 and 6. It should be noted that the invention is not limited to the timing of the DoS inquiry and the Response to DoS inquiry as illustrated relative to Phases I and II.

How to detect DoS attacks is not part of the present invention since detection thereof is well known. The at least one network can, for example, detect the number and the time interval of the initial authentication messages and base the decision thereon to fall back to the serialized processing mode of the prior art to avoid the DoS attack.

Depending on the first phase authentication signalling system, Phase II can be started in different phases of the Phase I authentication (as in FIGS. 7-12). How to combine the phases depends on the protocols and authentication methods.

Also privacy may be a concern addressed by the present invention if the second phase includes information that needs to be protected with the first phase. However, the second phase signalling can start without protection and continue with protection when first phase is finished.

While the invention has been described in terms of its preferred embodiments, it should be understood that numerous modifications may be made thereto. It is intended that all such modifications fall within the scope of the appended claims.

The invention claimed is:

1. In a communication system comprising at least one network, including network entities which provide connectivity to user equipment, a method of connecting the user equipment to the at least one network comprising:
   establishing a secure tunnel which provides connection between the user equipment and one of the network entities; and
   authenticating the user equipment with another of the network entities, wherein
   the authenticating of the user equipment with the another of the network entities occurs at least partially simultaneously with a phase of the establishing of the secure tunnel, wherein the phase is determined based on a protocol or authentication method,
   wherein establishing the secure tunnel begins before authenticating the user and wherein during a time between a beginning of establishing the secure tunnel with one of the network entities and a beginning of authenticating the user equipment with another of the network entities, the at least one network communicates with the user equipment to confirm that the request from the user equipment to establish a secure tunnel is not part of a denial of service attack, and wherein
   communication during the time includes at least one of a request for an identification of the user equipment and a request for capability of the user equipment to support at least one data protocol.

2. A method in accordance with claim 1 wherein:
   the one network entity comprises a server and the another network entity comprises a server.

3. A method in accordance with claim 1 comprising:
   an access network which provides connection of the user equipment to the network, the secure tunnel is established between the user equipment and the access network and the one network entity is part of the access network.

4. A method in accordance with claim 1 wherein:
   the user equipment is wirelessly connected to the at least one network.

5. A method in accordance with claim 3 wherein:
   the access network communicates with the user equipment to confirm that the request from the user equipment to establish a secure tunnel is not part of a denial of service attack.

6. A method in accordance with claim 5 wherein:
   communication during the time includes at least one of a request for an identification of the user equipment and a request for capability of the user equipment to support at least one data protocol.

7. A method in accordance with claim 1 wherein:
   the at least one network comprises a home network.

8. A method in accordance with claim 1 wherein:
   the at least one network comprises a visited network.

9. A communication system comprising at least one network including network entities which provide connectivity to user equipment and wherein:

a secure tunnel is established which provides connection between the user equipment and one of the network entities, the user equipment is authenticated with another of the network entities, and the authenticating of the user equipment with the another of the network entities occurs at least partially simultaneously with a phase of the establishing of the secure tunnel, wherein the phase is determined based on protocol or authentication method, wherein the establishing the secure tunnel begins before authenticating the user equipment with the network and wherein during a time between a beginning of establishing the secure tunnel with one of the network entities and a beginning of authenticating the user equipment with another of the network entities, the at least one network communicates with the user equipment to confirm that the request from the user equipment to establish a secure tunnel is not part of a denial of service attack, and wherein communication during the time includes at least one of a request for an identification of the user equipment and a request for capability of the user equipment to support at least one data protocol.

10. A system in accordance with claim 9 wherein:
the one network entity comprises a server and the another network entity comprises a server.

11. A system in accordance with claim 9 comprising:
an access network which provides connection of the user equipment to the network, the secure tunnel is established between the user equipment and the access network and the one network entity is part of the access network.

12. A system in accordance with claim 9 wherein:
the user equipment is wirelessly connected to the at least one network.

13. A system in accordance with claim 9 wherein:
the access network communicates with the user equipment to confirm that the request from the user equipment to establish a secure tunnel is not part of a denial of service attack.

14. A user equipment in a communication system comprising at least one network, including network entities which provide connectivity to the user equipment and wherein:

a secure tunnel is established which provides connection between the user equipment and one of the network entities, the user equipment is authenticated with another of the network entities, and the authenticating of the user equipment with the another of the network entities occurs at least partially simultaneously with a phase of the establishing of the secure tunnel, wherein the phase is determined based on a protocol or authentication method, wherein the establishing the secure tunnel begins before the authenticating the user equipment with the network and wherein during a time between a beginning of establishing the secure tunnel with one of the network entities and a beginning of authenticating the user equipment with another of the network entities, the at least one network communicates with the user equipment to confirm that the request from the user equipment to establish a secure tunnel is not part of a denial of service attack, and wherein communication during the time includes at least one of a request for an identification of the user equipment and a request for capability of the user equipment to support at least one data protocol.

15. A user equipment in accordance with claim 14 wherein:
the one network entity comprises a server and the another network entity comprises a server.

16. A user equipment in accordance with claim 14 comprising:
an access network which provides connection of the user equipment to the network, the secure tunnel is established between the user equipment and the access network and the one network entity is part of the access network.

17. A user equipment in accordance with claim 14 wherein:
the user equipment is wirelessly connected to the at least one network.

18. A user equipment in accordance with claim 14 wherein:
the access network communicates with the user equipment to confirm that the request from the user equipment to establish a secure tunnel is not part of a denial of service attack.

* * * * *